Nov. 3, 1964   R. C. DAHN, JR., ET AL   3,155,750
APPARATUS AND METHOD FOR INTRODUCING ADDITIVES TO AN EXTRUDER
Filed April 19, 1961   2 Sheets-Sheet 1

Inventors:
Raymond C. Dahn Jr.
Martin J. Langan
Vincent E. Meyer
by Allard A. Braddock
Their Attorney Nov. 3, 1964    R. C. DAHN, JR., ET AL    3,155,750
APPARATUS AND METHOD FOR INTRODUCING ADDITIVES TO AN EXTRUDER
Filed April 19, 1961    2 Sheets-Sheet 2

Inventors:
Raymond C. Dahn Jr.
Martin J. Langan
Vincent E. Meyer by Allard A. Braddock
Their Attorney United States Patent Office 3,155,750
Patented Nov. 3, 1964

3,155,750
APPARATUS AND METHOD FOR INTRODUCING
ADDITIVES TO AN EXTRUDER
Raymond C. Dahn, Jr., Trumbull, Martin J. Langan, Bridgeport, and Vincent E. Meyer, Fairfield, Conn., assignors to General Electric Company, a corporation of New York
Filed Apr. 19, 1961, Ser. No. 104,167
8 Claims. (Cl. 264—40)

This invention relates to a method and apparatus for introducing additives to an extruder; more particularly, the invention relates to an extrusion apparatus in which cross-linking and other additives are added to feed stock at the time the feed stock enters the extruder.

Extrusion apparatus for extruding curable organic compositions such as the various natural and synthetic rubbers, curable polyethylene and copolymers thereof, and similar materials have been in use for a number of years. In one form of conventional apparatus, the feed stock, complete with cross-linking agents incorporated therein, is introduced to an extrusion apparatus in the form of a strip which is heated and worked in the apparatus to produce a highly viscous composition. After being extruded into a shape or as an insulating composition on wire, the extruded material is slowly passed through a curing oven such as a steam chamber to bring about the cure of the composition.

Extremely close control of the temperature and other conditions within the extruder has always been necessary to achieve satisfactory results. Since the cross-linking agent is incorporated in the feed stock, the material is apt to be partially cured at the time it is introduced to the extruder. If the temperature within the extruder is too high, the composition "sets up," i.e., cures, within the extruder and cannot be ejected through the extruder head. If the temperature is not sufficiently high, the viscosity may be too great for satisfactory extrusion to take place. The pretreatment and storage time of the feed stock are very crucial and many feed stocks may be stored for very short periods of time in order to avoid a harmful degree of cure.

The present invention has as one of its objects to provide a method and apparatus for extrusion of organic compositions wherein the time of storage of the feed stock is not critical.

Another object of the invention is to provide an extrusion apparatus in which cross-linking and other agents are added to the feed stock at the time it enters the apparatus.

A further object of the invention is to provide an extrusion apparatus in which cross-linking and other agents are added to the apparatus at a rate closely correlated to the feed rate of a plurality of strips of feed stock material.

Other objects of the invention will become apparent from the following specification considered in conjunction with the drawing wherein FIG. 1 is a block schematic diagram illustrating the method and apparatus of the present invention;

Briefly stated, in accordance with one of its aspects, the present invention is directed to an extrusion apparatus wherein the additive feed mechanism comprises a hopper for feeding additive, an endless belt onto which additive is fed from the hopper for conveyance to the intake of the extrusion apparatus, and means responsive to the mean rate of flow of feed stock for adjusting the rate of advancement of the endless belt whereby the feed rate of the additive is maintained in constant proportion to the unit feed rate of the feed stock.

Figure 1:
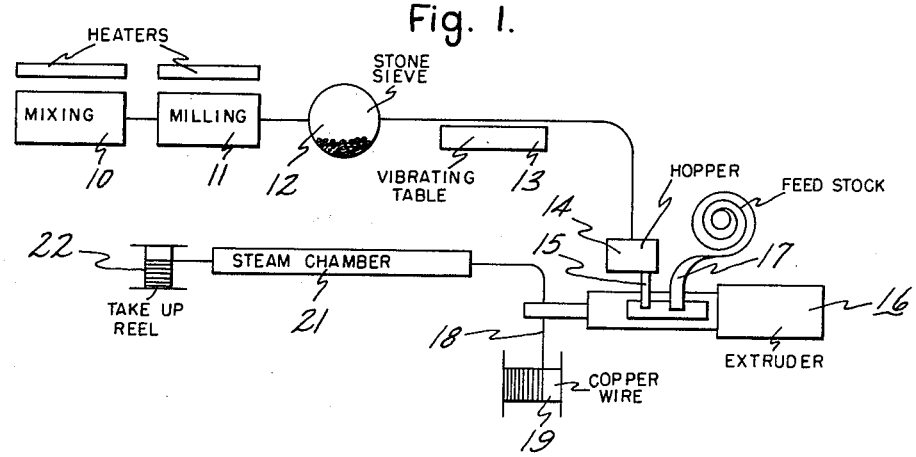

As those skilled in the art well know, it is not only crucial to maintain the correct proportions of cross-linking agent within the feed stock but very intimate mixing is also necessary. Conventionally, mixing of the feed stock including the cross-linking agent has been preformed in a Banbury machine and the mixture has been stored in a slightly cured and slowly curing condition. In accordance with the present invention, the feed stock is worked in a Banbury mixer in accordance with conventional practice except that no cross-linking agent is added in the Banbury. Instead, the cross-linking agent together with additive materials such as zinc oxide, coloring agent, etc., dispersed in waxes or waxlike materials is separately prepared as best illustrated in FIG. 1. The components of the additive composition are measured into the heated mixer 10 where they are mixed to homogeneity and then milled in the heated milling apparatus 11 which converts the composition from a heavy paste to material of a flaky consistency. The flakes are then tumbled in the stone sieve 12 where the flakes are broken up to produce a granular material with some very fine particles. The fine particles are separated on a vibrating table 13 and are reworked. The granular material may be stored until such time as it is desired for use. When ready for use, the material is added to a hopper 14.

During use the additive granules pass from the hopper 14 to an endless conveyor belt 15 from which they pass to an extrusion apparatus 16 at a rate consistent with the feed rate of two or more strips of feed stock 17. After thorough admixture and heating in the extruder 16, the feed stock 17 and additive material are extruded on to a copper wire 18 being drawn off a reel 19 after which the wire with its coating of extruded material is passed through a steam curing chamber 21 where the cure of the extruded composition is completed and the insulated wire is then wound on a take-up reel 22.

Figure 2:
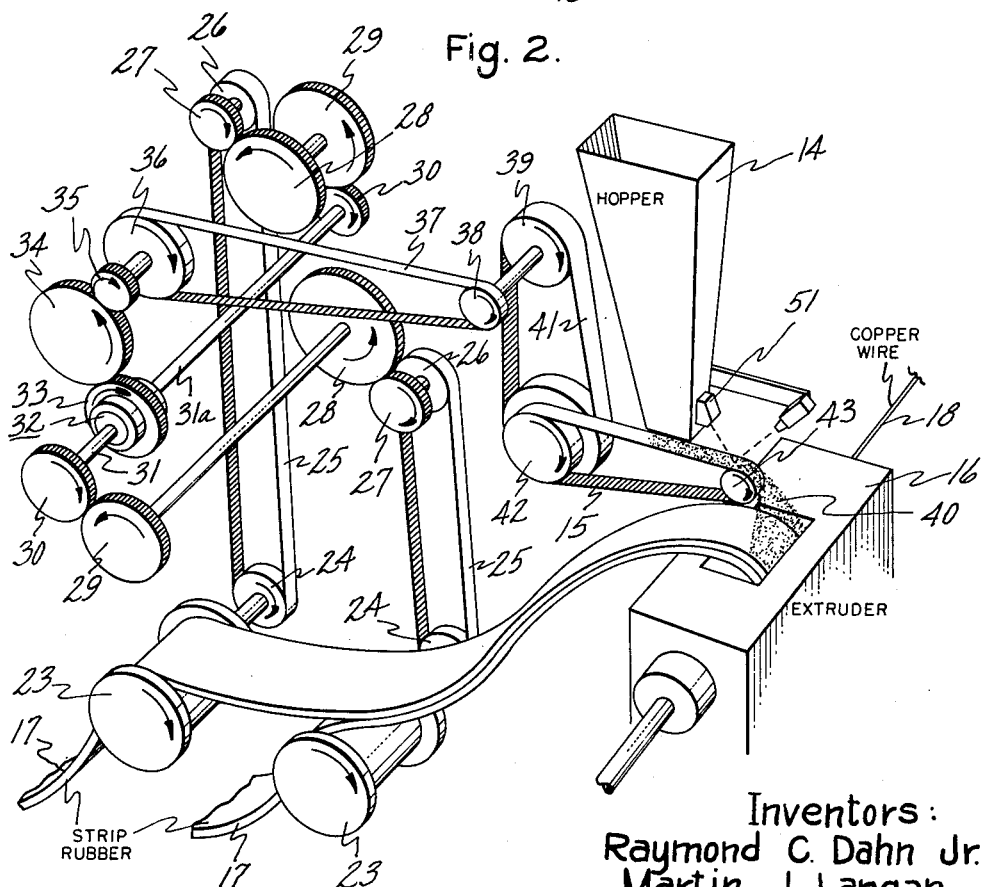
FIG. 2 is a perspective illustrating the additive feed control of the present invention.

Referring particularly to FIG. 2, the strips of feed stock 17 are drawn over rollers 23 which are rotated by such passage. Each roller 23 is connected to a pulley 24 which advances a belt 25 to rotate a second pulley 26 in rotatable engagement with a gear 27 which is in turn part of a gear train 28, 29, and 30, the latter of which is mounted on an input shaft 31 or 31a of a differential gear assembly 32.

The differential gear assembly 32 operates in a manner analogous to the differential gear of an automobile. The gear assembly 32 has an output member 33 rotatable at the mean rate of rotation of the input shafts 31 and 31a. The output member 33 corresponds to the drive shaft of an automobile differential and the input shafts 31 and 31a correspond to the rear axles of an automobile. However, the action is the reverse of an automobile differential in that power is supplied to the input shafts 31 and 31a and the power take-off is from the output gear 33. While the differential gear assembly 32 is a very important part of the present invention, the gear itself is a conventional stock item such as may be purchased from the Milwaukee Lock and Mfg. Co., 5024 North 37th Street, Milwaukee 9, Wisc.

The output from the differential assembly 32 is transmitted by means of a power train consisting of a gear 34, gear 35, pulley 36, belt 37, pulley 38, pulley 39, and belt 41 to a pulley 42 which serves to drive the conveyor belt 15 around a pulley 43. The conveyor belt 15 is shown in cross section in FIG. 4 where it will be noted that the belt is contoured to provide a central trough and side walls which are almost engaged by the hopper 14.

With this construction if the belt 15 should stop for any reason, the trough around the hopper outlet would be very quickly filled after which further pouring from the hopper would cease.

Figure 4:
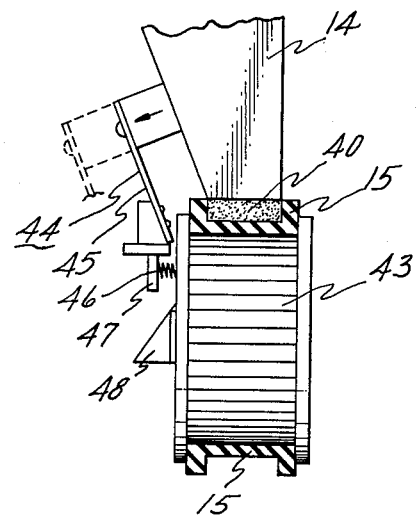
FIG. 4 is a broken view partly in section of the hopper and conveyor belt of the present invention.

Referring to FIG. 4, the hopper 14 is desirably provided with a rocking or shaking mechanism 44 to prevent caking of additive 40 within the hopper. The rocking mechanism 44 consists of an arm 45 extending outward from the hopper 14 and movable with respect thereto. The arm 45 is biased by a spring 46 against the hopper 14 in the position illustrated in FIG. 4. The extending end of the arm 45 has a cam contacting member 47 engageable by a cam 48 mounted at the perimeter of the pulley 43. Thus, on each revolution of the pulley 43 the cam 48 engages the cam contacting surface 47 which displaces the arm 45 to the position shown in dotted lines in FIG. 4. On restoration of the arm the hopper 14 is given a shake which prevents caking of the additive 40 therein.

Referring to FIG. 2, a feature of the present invention is the use of a photoelectric trouble-finder 51 mounted upon the hopper 14. It has been found that such a photoelectric member can detect the absence of additive 40 from conveyor belt 15. The trouble-finder 51 may be connected to a warning signal (not shown) and also the master switch (not shown) for the extruder 16 so that all operations will cease in the event the hopper is not supplied with sufficient additive.

Figure 3:
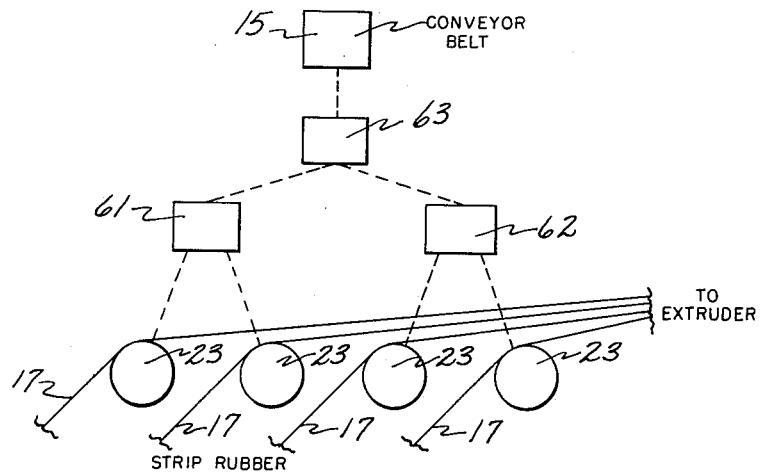
FIG. 3 is a schematic diagram of the additive feed control of the present invention where four strips of feed stock are in use.

FIG. 3 illustrates schematically an operation similar to that illustrated in FIG. 2 except that there are four strips of feed stock 17 and four pulleys 23 each of which is engaged by a strip of feed stock. To accommodate a four-feed strip operation, it is necessary to have differentials 61 and 62 the outputs of which feed into a third differential 63 the output of which operates the conveyor belt 15 in the manner illustrated in FIG. 2. In FIG. 3 belt and gear trains have been represented by dotted lines, the connections to the input shafts of the differential gears 61 and 62 being represented by dotted lines running to these gears from the pulleys 23 and the dotted lines between the differential gears 61 and 62 and differential gear 63 representing the gear trains from the outputs of the gears 61 and 62 connected to the input shafts of the gears 63. The dotted line between the differential gear 63 and conveyor belt 15 represents the gear and belt train connecting the output of the gear 63 to this belt. In the arrangement of FIG. 3, any number of strips of feed stock less than four may be accommodated since an idle roller 23 reduces the rotation rate of the output of its associated differential gear to half of what it would be if both rollers 23 were rotating the input shafts at the same speed. Obviously, the accommodation of more than four strips of feed stock could be effected by multipling in additional differential gear units in a manner analogous to that illustrated in FIG. 3.

Referring to FIG. 2, it will be noted that a change in the feed rate of one of the strips of feed stock 17 is reflected very quickly in the rate at which additive 40 is fed to the extruder 16. The principal delay in the additive feed rate response is the time it takes the additive to move from the feed point to the discharge point of the belt 15. This distance can be minimized by locating the hopper 14 near the pulley 43. Actually, the momentary time lag due to the time the additive is on the belt 15 has not proved to be detrimental to effective operation of the extruder. This is rather surprising in view of the narrow range of additive percent composition if satisfactory results are to be achieved. Nevertheless, it has been found that extrusion apparatus may be operated for long periods of time while giving satisfactory results with the additive feed control of this invention. As one strip of feed stock is used up, another may readily be added without interrupting the correct proportioning of additive provided by the use of this invention.

While the invention has been described with reference to certain specific embodiments thereof, it is obvious that there may be variations which still fall within the true spirit of the invention. Therefore, the invention should be limited in scope only as may be necessitated by the scope of the appended claims.

What we claim as new and desire to secure by Letters Patent of the United States is:

1. An additive feeding apparatus for feeding controlled quantities of particulate additives to a receiver comprising a pair of rollers each of which is rotatable by a strip of feed stock drawn thereover, a differential gear box having a rotatable input connection to each of said rollers, said gear box having an output member rotatable at the mean rotation rate of said rollers, an endless belt advanced by said differential output to feed additives to the intake of said receiver, and a hopper disposed to pass additives to said endless belt.

2. An additive feeding apparatus for feeding into a receiver controlled quantities of additives along with two strips of feed stock comprising a roller for each strip of feed stock rotatable by passage of said strip thereover, a belt and gear train rotated by each roller, a differential gear having two input shafts and one rotatable load member, said load member being rotatable at the mean rate of the input shafts, each input shaft being rotatably connected to one of the belt and gear trains, an endless conveyor belt mounted on pulleys rotatably connected to said load member, said belt being disposed to feed additives to said receiver, and a hopper disposed to feed additives to said endless belt.

3. An additive feeding apparatus as claimed in claim 2 wherein the endless conveyor belt has a center trough and the hopper outlet has minimal clearance with the sides of said belt.

4. An additive feeding apparatus for introducing to a receiver controlled quantities of additive comprising two spaced rollers each of which is positioned to be rotated by a strip of feed stock passing thereover, a differential gear having two input shafts and a rotatable output load member, said load member being rotatable at the mean rotation rate of said input shafts, a gear train connecting each roller with one of said input shafts, an endless conveyor belt mounted on a pair of pulleys disposed to feed additive material to said receiver, a gear train connecting one of said pulleys to said output load member, a hopper disposed to discharge additive material on to said conveyor belt, a spring-biased trip member connected to said hopper, and a tripping cam positioned at the periphery of one of said pulleys for tripping said trip member to effect the shaking of said hopper.

5. An additive feeding apparatus as claimed in claim 4 wherein a photoelectric cell is positioned to detect the presence of additive material on said endless belt and to indicate a malfunction in case of an interruption in the flow of said material.

6. An additive feeding apparatus for introducing to a receiver controlled quantities of additive comprising at least three and not more than four spaced rollers each of which is positioned to be rotated by a strip of feed stock passing thereover, a first, second, and third differential gear each of which has two input shafts and an output load member, the output load members of said first and second differential gears being rotatably connected to the input shafts of said third differential gear, a gear train connecting each roller to an input shaft of said first and second differential gears, an endless conveyor belt mounted on a pair of spaced pulleys, said belt being disposed to convey additive material to the input of said receiver, a gear train connecting the load member of said third differential gear in driving relationship with one of said pulleys, and a hopper disposed to introduce additive material onto said endless belt.

7. Additive feeding apparatus for proportionate feeding of particulate material to a receiver of multiple strips of feed stock which comprises, a hopper for feeding particulate additive, an endless belt onto which said additive is fed from said hopper for conveyance to the intake of said receiver, means responsive to the mean rate of flow to said intake of at least two strips of said feed stock for adjusting the rate of advancement of said endless belt whereby the feed rate of the additive is maintained in constant proportion to the unit feed rate of feed stock.

8. The method for proportionate introduction of particulate material into a receiving composition which comprises forming the composition into strips, introducing at least two of such strips to an intake station by drawing each strip over a roll rotated by passage of said strip, feeding the particulate material to said station by an endless belt, moving said belt at a speed directly proportional to the mean rate of rotation of said rolls, and passing said particulate material from said endless belt to said intake station along with said strips of material.

References Cited in the file of this patent
UNITED STATES PATENTS

| | | |
|---|---|---|
| 2,102,584 | Brown | Dec. 21, 1937 |
| 2,645,447 | Clark et al. | July 14, 1953 |
| 2,736,923 | Schieser et al. | Mar. 6, 1956 |
| 2,764,779 | Zona | Oct. 2, 1956 |
| 2,864,537 | Throop et al. | Dec. 16, 1958 |
| 2,921,872 | McGlamery | Jan. 19, 1960 |